(12) United States Patent
Wu et al.

(10) Patent No.: US 11,493,983 B2
(45) Date of Patent: Nov. 8, 2022

(54) HEAD MOUNTED DISPLAY DEVICE AND POWER MANAGEMENT METHOD THEREOF

(71) Applicant: HTC Corporation, Taoyuan (TW)

(72) Inventors: Chuan-Li Wu, Taoyuan (TW); Chin-Chiang Huang, Taoyuan (TW); LungTing Chin, Taoyuan (TW); Shang Ze Lin, Taoyuan (TW); Cheng Hsiao Shih, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/460,313

(22) Filed: Aug. 30, 2021

(65) Prior Publication Data

US 2022/0137697 A1 May 5, 2022

Related U.S. Application Data

(60) Provisional application No. 63/107,426, filed on Oct. 29, 2020.

(51) Int. Cl.
*G06F 1/3234* (2019.01)
*G02B 27/01* (2006.01)

(52) U.S. Cl.
CPC ......... *G06F 1/3265* (2013.01); *G02B 27/017* (2013.01); *G02B 2027/0192* (2013.01)

(58) Field of Classification Search
CPC ................ G06F 1/3265; G02B 27/017; G02B 2027/0192
See application file for complete search history.

(56) References Cited

U.S. PATENT DOCUMENTS

| 2015/0062022 | A1 | 3/2015 | Rabii |
| 2017/0097666 | A1 | 4/2017 | Shin et al. |
| 2019/0094949 | A1 | 3/2019 | Kurian et al. |
| 2021/0373833 | A1* | 12/2021 | Pawar ................... G06F 1/3218 |

FOREIGN PATENT DOCUMENTS

| CN | 209028600 | 6/2019 |
| TW | 201621556 | 6/2016 |

OTHER PUBLICATIONS

"Office Action of Europe Counterpart Application", dated Mar. 14, 2022, p. 1-p. 10.
"Office Action of Taiwan Counterpart Application", dated May 4, 2022, p. 1-p. 6.

* cited by examiner

*Primary Examiner* — Stephen G Sherman
(74) *Attorney, Agent, or Firm* — JCIPRNET

(57) ABSTRACT

A head mounted display device and a power management method are provided. The head mounted display device includes a host device and a power input device. The power input device is detachably connected to a power device and an electronic device. The power input device generates a first input signal according to a supply voltage value of the power device, and generates a second input signal according to power supply information of the electronic device. The host device enters a power saving mode or performs a boot-up operation according to the first input signal and the second input signal.

20 Claims, 3 Drawing Sheets

HEAD MOUNTED DISPLAY DEVICE AND POWER MANAGEMENT METHOD THEREOF

CROSS-REFERENCE TO RELATED APPLICATION

This application claims the priority benefit of U.S. Provisional Application No. 63/107,426, filed on Oct. 29, 2020. The entirety of the above-mentioned patent application is hereby incorporated by reference herein and made a part of this specification.

BACKGROUND

Technical Field

The disclosure relates to a head mounted display device and a power management method thereof, and more particularly to a head mounted display device that may avoid abnormal shutdown due to insufficient power and a power management method thereof.

Description of Related Art

In today's hardware design thinking of a head mounted display device for virtual reality/augmented reality, manufacturers have moved tasks of processing data calculations onto an external handheld electronic device to achieve head-wearing comfort and portability for users, allowing users to enjoy virtual reality effects with the electronic device connected to the head mounted display device through a specific wire. Under such conditions, the head mounted display device is powered by power output capability of the handheld electronic device and/or an expansion power supply (power bank). However, On-The-Go (OTG) power output capability of handheld electronic devices on the market is not clearly marked and often lower than expected standard values when actually tested. When power consumption of a head mounted display device is far greater than what OTG power can actually withstand, such a combination causes the head mounted display device to boot up/shut down abnormally and leads to abnormal power consumption, resulting in malfunction of the head mounted display device.

SUMMARY

The disclosure provides a head mounted display device and a power management method thereof, which may reduce the possibility of abnormal shutdown due to insufficient power.

The head mounted display device of the disclosure includes a host device and a power input device. The power input device is coupled to the host device, and is detachably connected to a power device and an electronic device. The power input device generates a first input signal according to a supply voltage value of the power device, and generates a second input signal according to power supply information sent by the electronic device. The host device enters a power saving mode or executes a boot-up operation according to the first input signal and the second input signal.

The power management method of the head mounted display device of the disclosure includes the following steps. A power input device is provided to be coupled to a host device. The power input device is provided to be detachably connected to a power device and an electronic device. The power input device generates a first input signal according to a supply voltage value of the power device, and generates a second input signal according to power supply information sent by the electronic device. The host device enters a power saving mode or executes a boot-up operation according to the first input signal and the second input signal.

Based on the above, the head mounted display device of the disclosure detects the power supply states of the power device and of the electronic device in real time, and enables the host device to execute the boot-up operation only when the power is determined to be sufficient. When the power is insufficient, the head mounted display device of the disclosure enters the power saving mode and notifies a user of the state of insufficient power. In this way, the head mounted display device does not shut down abnormally when the power is insufficient, which effectively reduces user misunderstandings and improves the comfort of use.

DESCRIPTION OF THE EMBODIMENTS

Figure 1:
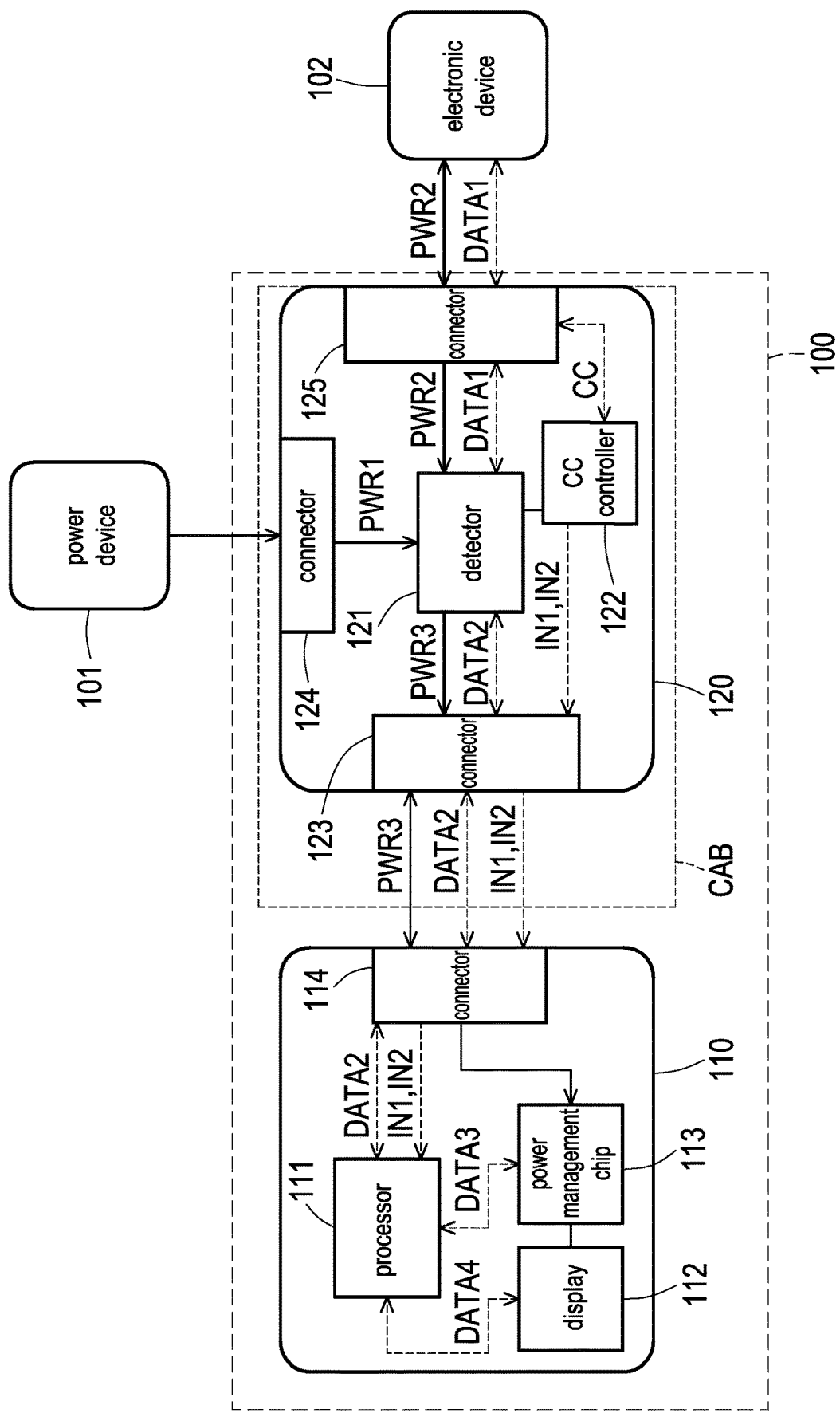
FIG. 1 is a schematic diagram of a head mounted display device according to an embodiment of the disclosure.

Please refer to FIG. 1. FIG. 1 is a schematic diagram of a head mounted display device according to an embodiment of the disclosure. A head mounted display device 100 includes a host device 110 and a power input device 120. The host device 110 and the power input device 120 are coupled to each other. The power input device 120 is used to be detachably connected to a power device 101 and an electronic device 102. In this embodiment, the power device 101 may be any type of power (for example, a power bank). The electronic device 102 may be any type of an electronic device, for example, a handheld electronic device such as a mobile phone or a notebook computer. The power input device 120 may be disposed in a cable CAB.

In the hardware architecture, the host device 110 includes a processor 111, a display 112, a power management chip 113, and a connector 114. The power input device 120 includes a detector 121, a configuration channel (CC) controller 122, and connectors 123 to 125. The host device 110 is mutually coupled with the connector 123 of the power input device 120 through the connector 114. The power input device 120 may be mutually detachably connected with the power device 101 through the connector 124, and may be mutually detachably connected with the electronic device 102 through the connector 125. The connectors 124 and 125 may be universal serial bus (USB) interface connectors. In this embodiment, the connectors 124 and 125 may be Type C USB connectors. The processor 111 may transmit and receive data DATA3 and DATA4 with the display 112 and the power management chip 113, respectively.

In the power input device 120, when the power device 101 is coupled to the connector 124, the connector 124 may receive supply power PWR1 provided by the power device 101 and transmit the supply power PWR1 to the detector 121. The detector 121 is used to detect a supply voltage value of the supply power PWR1 and generate a first input signal IN1 according to a comparison result. The detector 121 sets the first input signal IN1 as a first logic value when the supply voltage value of the supply power PWR1 is greater than a reference value, and clears the first input signal IN1 as a second logic value when the supply voltage value of the supply power PWR1 is not greater than the reference value. The first logic value is different from the second logic value. For example, the first logic value may be equal to a high logic level (or a low logic level), and the second logic value may be equal to the low logic level (or the high logic level). The above reference value is a preset value and may be set according to the power consumption state of the head mounted display device 100 during operation without specific limitation.

On the other hand, when the electronic device 102 is coupled to the connector 125, the CC controller 122 may receive power supply information CC sent by the electronic device 102 through the connector 125. The CC controller 122 analyzes the power supply information CC to determine whether power supply power of the electronic device 102 is greater than a minimum required power allowing the head mounted display device 100 to boot up. If the power supply power of the electronic device 102 is greater than the minimum required power allowing the head mounted display device 100 to boot up, the detector 121 may set a second input signal IN2 as the first logic value. In contrast, when the power supply power of the electronic device 102 is not greater than the minimum required power, the detector 121 may clear the second input signal as the second logic value.

In this embodiment, the power supply information CC may be an information packet of a power data object (PDO).

On the other hand, the connector 125 may serve as a transmission medium between the electronic device 102 and the power input device 120 for supplying power PWR2 and data DATA1. In addition, the detector 121 may transmit power PWR3, data DATA2, the first input signal IN1, and the second input signal IN2 with the host device 110 through the connector 123.

In the host device 110, the power management chip 113 may transmit the power PWR3 with the power input device 120 through the connector 114. The processor 111 may transmit the data DATA2 with the power input device 120 through the connector 114, and may receive the first input signal IN1 and the second input signal IN2 through the connector 114.

It should be noted that the processor 111 may determine whether to execute a boot-up operation according to logic values of the first input signal IN1 and the second input signal IN2. In an embodiment of the disclosure, when the first input signal IN1 and the second input signal IN2 are both at a first logic level, the processor 111 may execute the boot-up operation, and when one of the first input signal IN1 and the second input signal IN2 is at a second logic level, a power saving mode is entered.

In another embodiment of the disclosure, the processor 111 may also execute the boot-up operation when only the second input signal IN2 is at the first logic level. The detector 121 in the power input device 120 may determine whether the supply power provided by the electronic device 102 is greater than a minimum operable power of the head mounted display device 100. When the supply power provided by the electronic device 102 is greater than the minimum operable power of the head mounted display device 100, the detector 121 may make the second input signal IN2 the first logic level. Under such conditions, when the processor 111 determines that only the second input signal IN2 is at the first logic level, the boot-up operation may also be executed.

In addition, when the host device 110 enters the power saving mode, a notification message of insufficient power may be generated by the display 112 to inform a user of the current reason for the head mounted display device 100 unable to boot up.

In this embodiment, the detector 121 of the power input device 120 may detect the supply states of the external power device 101 and the electronic device 102 in real time. Moreover, the boot-up operation is executed only when the power supply states of the power device 101 and the electronic device 102 can enable the host device 110 to boot up. In this way, the possibility of abnormal shutdown of the head mounted display device 100 due to insufficient power may be effectively reduced.

Figure 2:
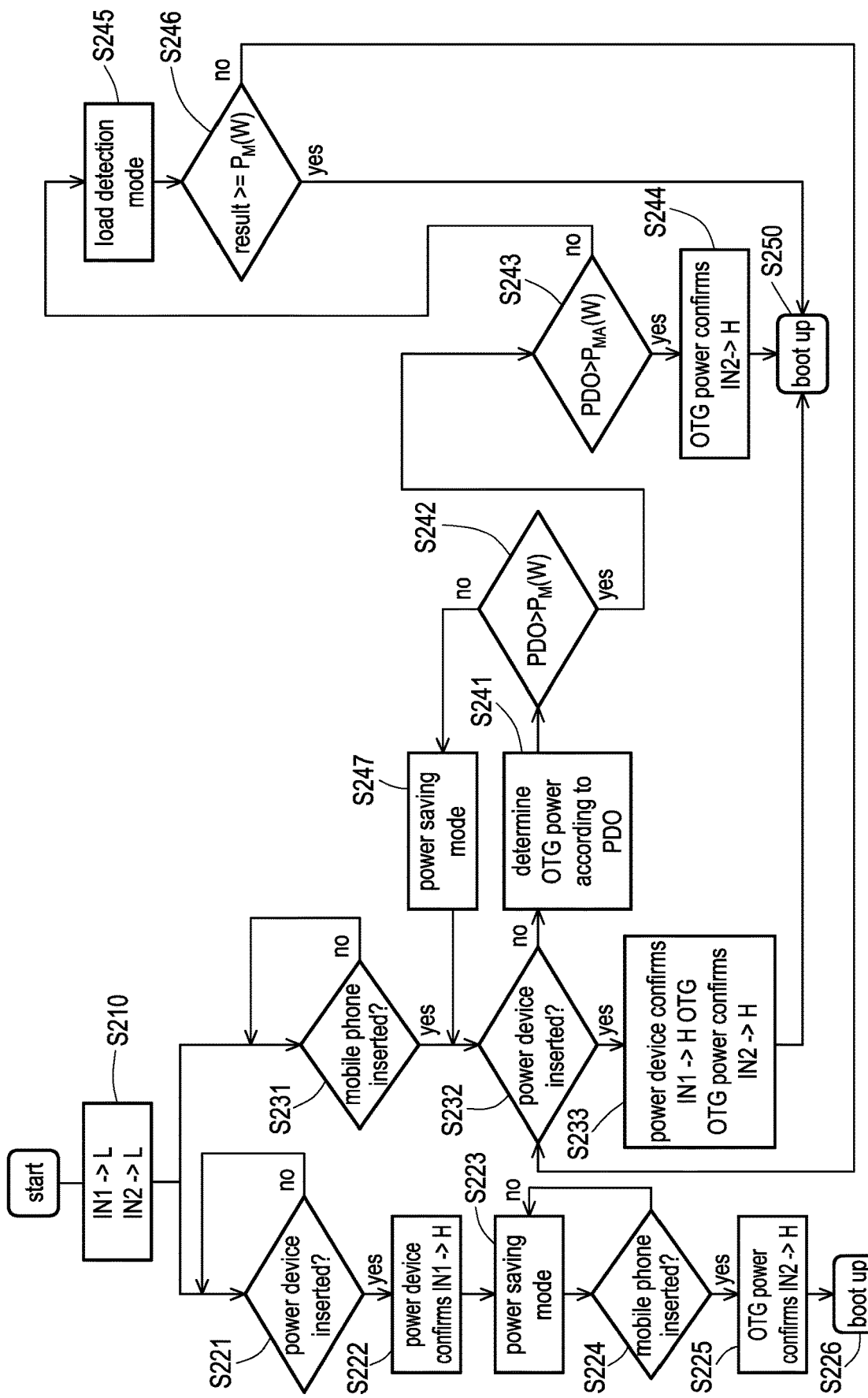
FIG. 2 is a working flow chart of a head mounted display device according to an embodiment of the disclosure.

Please refer to FIG. 2. FIG. 2 is a working flow chart of a head mounted display device according to an embodiment of the disclosure. In step S210, the first input signal IN1 and the second input signal IN2 are respectively cleared as a second logic value (L). Next, in step S221, the power input device may continuously detect whether a power device is inserted. When the power device is inserted into the power input device for mutual connection, step S222 may be executed.

In step S222, the power input device may detect the supply voltage value of the power device and set the first input signal IN1 as a first logic value (H) when the supply voltage value is greater than the reference value, enabling the host end to enter the power saving mode in step S223. Next, the power input device may detect whether an electronic device (mobile phone) is inserted (step S224). If a mobile phone is detected to be inserted into the power input device for mutual connection, the power input device may confirm On-The-Go (OTG) power of the mobile phone and enable the host to execute the boot-up operation (step S226) when the OTG power is detected to be greater than a critical value.

On the other hand, if a power device is not detected to be inserted into the power input device, when a mobile phone is detected to be inserted into the power input device (step S231), step S232 may be executed to confirm whether a power device is inserted into the power input device in subsequent actions. When a power device is determined to be inserted into the power input device in step S232, by confirming the supply voltage value of the power device and the OTG power of the mobile phone before respectively setting the first input signal IN1 and the second input signal IN2 as the first logic value (H) accordingly, the boot-up operation (step S250) is executed.

If no power device is determined to be inserted into the power input device in step S232, the power input device may determine the OTG power of the mobile phone according to a power data object PDO provided by the mobile phone, and the power data object PDO may represent power supply power of the OTG power. Moreover, in step S242, it is determined whether the power data object PDO is not less than a first critical value $P_{MA}(W)$. If the power data object PDO is not less than the first critical value $P_{MA}(W)$, step S243 is executed. On the contrary, if the power data object PDO is less than the first critical value $P_{MA}(W)$, step S247 is executed for entering the power saving mode.

In step S243, the power input device further determines whether the power data object PDO is not less than a second critical value $P_{MA}(W)$. When the power data object PDO is not less than the second critical $P_{MA}(W)$, step S244 may be executed. On the contrary, when the power data object PDO is less than the second critical $P_{MA}(W)$, step S245 may be executed.

The above first critical value $P_M(W)$ is the minimum operable power of the head mounted display device, and the second critical value $P_{MA}(W)$ is the minimum required power allowing the head mounted display device to boot up.

In step S244, the power input device may confirm the OTG power of the mobile phone and set the second input signal IN2 as the first logic value (H) accordingly. Furthermore, in step S250, the host device may execute the boot-up operation according to the second input signal IN2 equal to the first logic value.

In step S245, the power input device may enter a load detection mode for further determination of the power data object PDO, confirming the power supply information of the mobile phone again based on whether the power data object PDO is greater than or equal to the first critical value $P_M(W)$. In step S246, when the determination result of step S245 indicates that the power data object PDO is greater than or equal to the first critical value $P_M(W)$, step S250 is executed to perform the boot-up operation. When the determination result of step S245 indicates that the power data object PDO is less than the first critical value $P_M(W)$, step S232 is executed.

Figure 3:
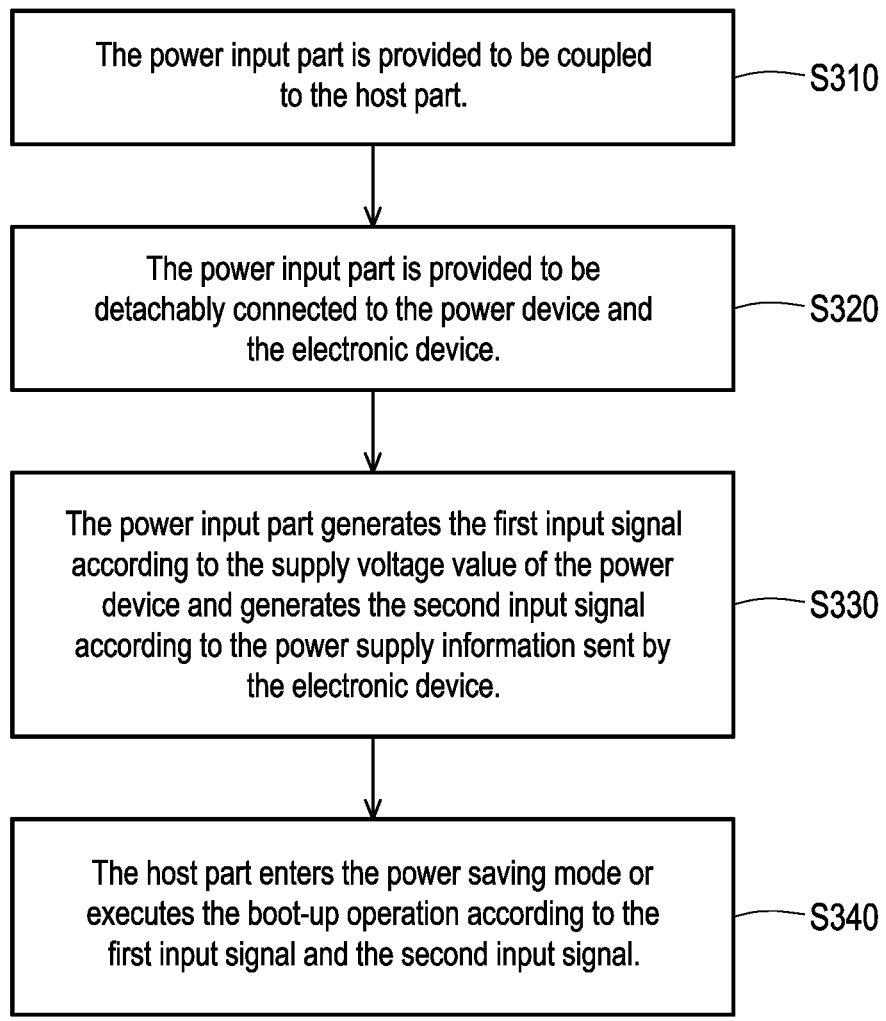
FIG. 3 illustrates a power management method of the head mounted display device according to the embodiments of the disclosure.

Please refer to FIG. 3. FIG. 3 illustrates a power management method of the head mounted display device according to the embodiments of the disclosure. In step S310, the power input device is provided to be coupled to the host device. In step S320, the power input device is provided to be detachably connected to the power device and the electronic device. In addition, in step 330, the power input device generates the first input signal according to the supply voltage value of the power device and generates the second input signal according to the power supply information sent by the electronic device. In step S340, the host device enters the power saving mode or executes the boot-up operation according to the first input signal and the second input signal.

Implementation details of the above multiple steps have been explained elaborately in the multiple embodiments above, and details are not described herein.

In summary, the head mounted display device of the disclosure detects the power supply states of the electronic device and the power device and determines whether to enable the host device to perform the boot-up operation according to the power supply states of the electronic device and the power device. In this way, the head mounted display device boots up only when the power is sufficient, and does not shut down abnormally due to insufficient power, maintaining the user's comfort of use.

What is claimed is:

1. Head mounted display device, comprising:
a host device; and
a power input device, coupled to the host device, detachably connected to a power device and an electronic device external from the head mounted display device, wherein the power input device comprises a voltage detector generating a first input signal according to a supply voltage value of the power device, and a configuration channel controller generating a second input signal according to power supply information sent by the electronic device,
wherein the host device enters a power saving mode or executes a boot-up operation according to the first input signal and the second input signal.

2. He head mounted display device according to claim 1, wherein when the power device is connected to the power input device, the power input device detects the supply voltage value of the power device, sets the first input signal as a first logic value when the supply voltage value is greater than a reference value, and clears the first input signal as a second logic value when the supply voltage value is not greater than the reference value,
wherein the first logic value and the second logic value are complementary.

3. He head mounted display device according to claim 2, wherein when the electronic device is connected to the power input device, the power input device receives power supply information provided by the electronic device, determines whether a power supply power of the electronic device is not less than a minimum required power allowing the head mounted display device to boot up according to the power supply info nation, sets the second input signal as the first logic value when the power supply power is not less than the minimum required power, and clears the second input signal as the second logic value when the power supply power is less than the minimum required power.

4. He head mounted display device according to claim 3, wherein when the first input signal and the second input signal are both the first logic values, the host device executes the boot-up operation.

5. He head mounted display device according to claim 1, wherein when the power device is connected to the power input device and the electronic device is not connected to the power input device the host device enters the power saving mode.

6. He head mounted display device according to claim 1, wherein when the power device is not connected to the power input device and the electronic device is connected to the power input device, the power input device determines whether the power supply power is not less than a first critical value, and the host device enters the power saving mode when the power supply power is less than the first critical value.

7. He head mounted display device according to claim 6, wherein when the power supply power is not less than the first critical value, the power input device further determines whether the power supply power is not less than a second critical value; the host device directly executes the boot-up operation when the power supply power is not less than the second critical value, and the host device enters a load detection mode when the power supply power is less than the second critical value,
wherein the second critical value is greater than the first critical value.

8. He head mounted display device according to claim 7, wherein the second critical value represents a minimum required power allowing the head mounted display device to boot up, and the first critical value represents a minimum operable power of the head mounted display device.

9. He head mounted display device according to claim 7, wherein in the load detection mode, the host device reconfirms the power supply information, and enters the power saving mode or executes the boot-up operation according to whether the power supply power is not less than the first critical value.

10. He head mounted display device according to claim 7, wherein in the power saving mode, when the power device is connected with the power input device and the supply voltage value is greater than a reference value, the host device executes the boot-up operation.

11. He head mounted display device according to claim 1, wherein:
the voltage detector determining the supply voltage value of the power device to generate the first input signal; and
the configuration channel controller analyzing the power supply information to generate the second input signal.

12. A power management method of a head mounted display device, comprising:
providing a power input device to be coupled to a host device;
providing the power input device to be detachably connected to a power device and an electronic device external from the head mounted display device;
the power input device generating a first input signal according to a supply voltage value of the power device, and the power input device generating a second input signal according to power supply information sent by the electronic device; and
the host device entering a power saving mode or executing a boot-up operation according to the first input signal and the second input signal.

13. He power management method according to claim 12, when the power device is connected to the power input device, comprising:
detecting the supply voltage value of the power device;
setting the first input signal as a first logic value when the supply voltage value is greater than a reference value; and
clearing the first input signal as a second logic value when the supply voltage value is not greater than the reference value,
wherein the first logic value and the second logic value are complementary.

14. He power management method according to claim 13, when the electronic device is connected to the power input device, comprising:
receiving power supply information provided by the electronic device;
determining whether a power supply power of the electronic device is greater than a minimum required power allowing the head mounted display device to boot up according to the power supply information;
setting the second input signal as the first logic value when the power supply power is greater than the minimum required power; and
clearing the second input signal as the second logic value when the power supply power is not greater than the minimum required power.

15. He power management method according to claim 14, further comprising:
the host device executing the boot-up operation when the first input signal and the second input signal are both the first logic values.

16. He power management method according to claim 12, when the power device is not connected to the power input device, and the electronic device is connected to the power input device, comprising:
determining whether the power supply power is greater than a first critical value; and
the host device entering the power saving mode when the power supply power is not greater than the first critical value.

17. He power management method according to claim 16, when the power supply power is greater than the first critical value, further comprising:
determining whether the power supply power is greater than a second critical value;
the host device directly executing the boot-up operation when the power supply power is greater than the second critical value; and
the host device entering a load detection mode when the power supply power is not greater than the second critical value,
wherein the second critical value is greater than the first critical value.

18. He power management method according to claim 17, wherein the first critical value is a minimum required power allowing the head mounted display device to boot up, and the second critical value is a minimum operable power of the head mounted display device.

19. He power management method according to claim 17, further comprising:
in the load detection mode, the host device reconfirming the power supply information and entering the power saving mode or executing the boot-up operation according to whether the power supply power is greater than the second critical value.

20. The power management method according to claim 17, further comprising:
in the power saving mode, when the power device is connected with the power input device and the supply voltage value is greater than a reference value, the host device executing the boot-up operation.

* * * * *